Nov. 1, 1938.    W. H. BASELT    2,135,121
BRAKE ARRANGEMENT
Filed June 17, 1935    9 Sheets-Sheet 1
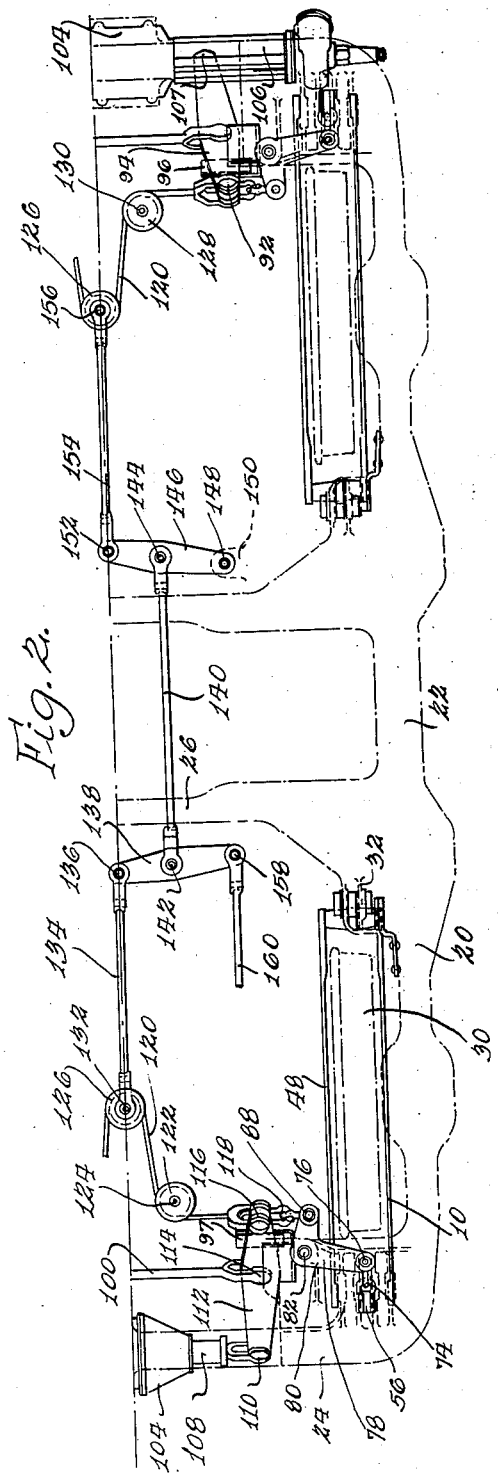
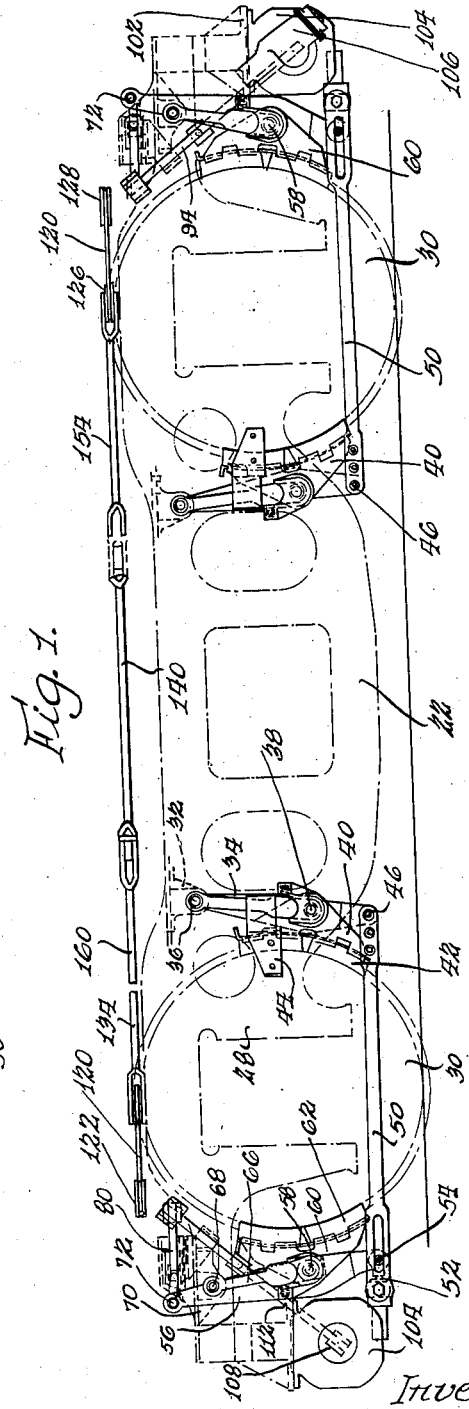
Inventor:
Walter H. Baselt
By Wilkinson, Huxley, Byron & Knight
Attys Nov. 1, 1938.       W. H. BASELT       2,135,121
BRAKE ARRANGEMENT
Filed June 17, 1935       9 Sheets-Sheet 2

Inventor:
Walter H. Baselt

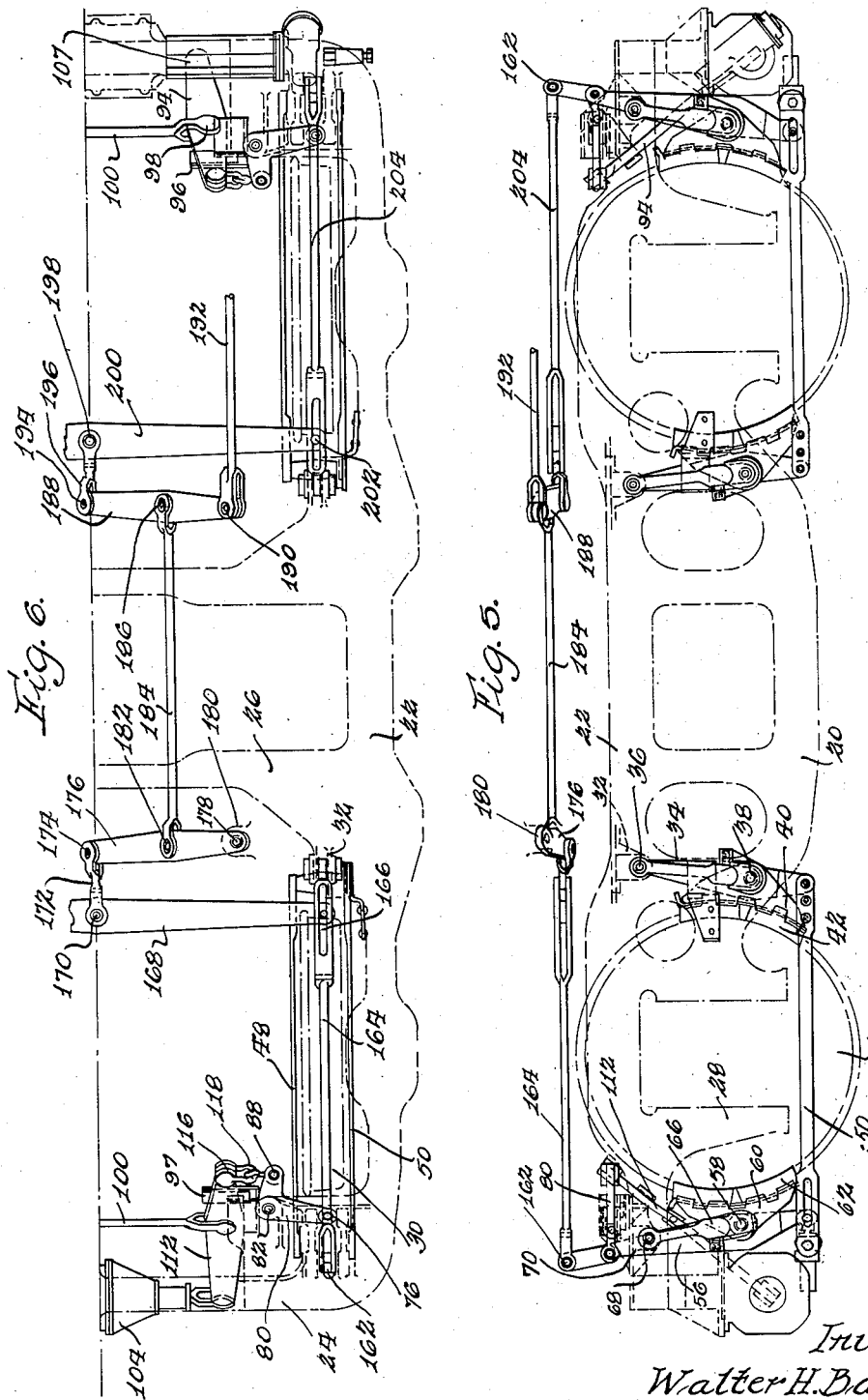

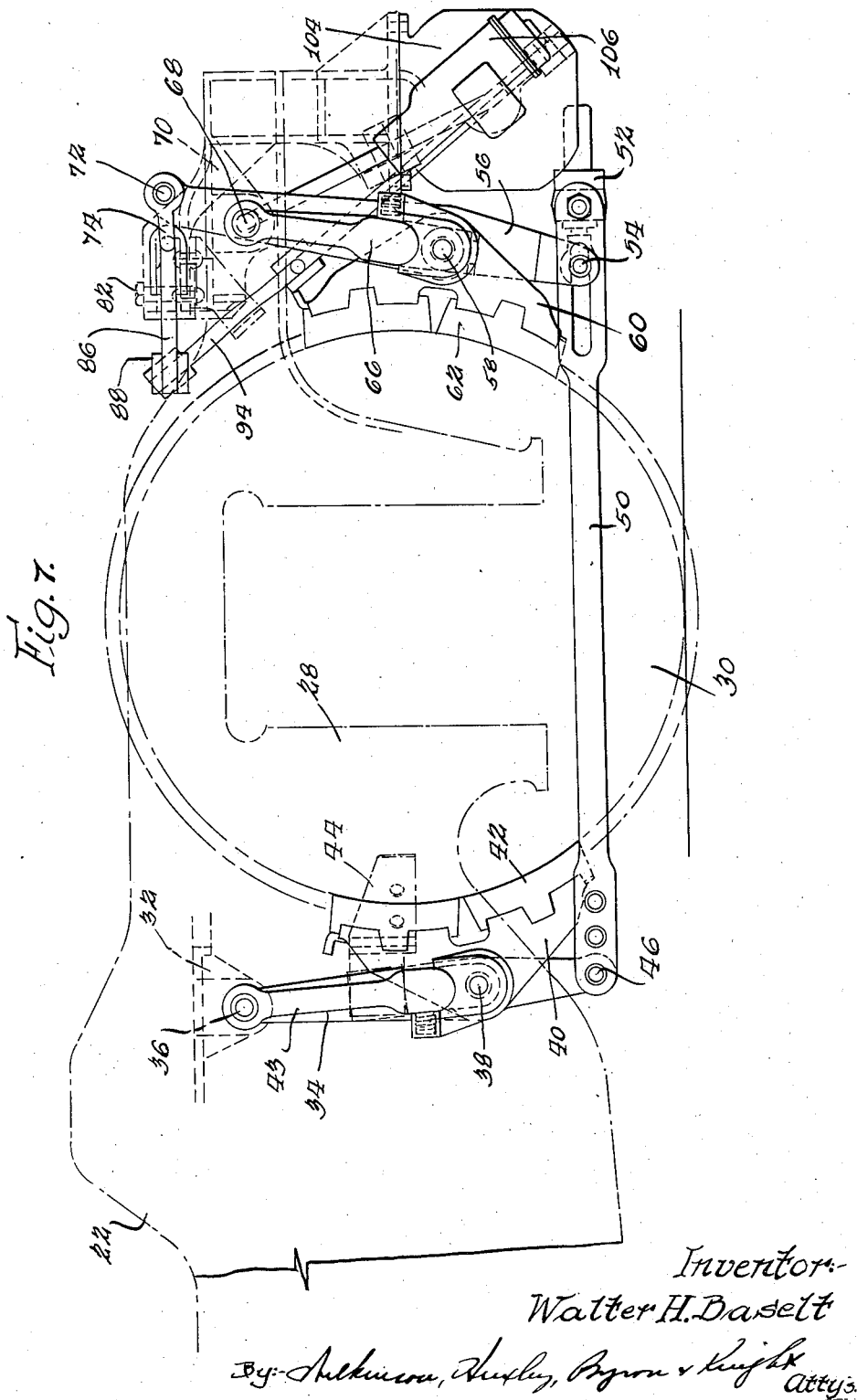

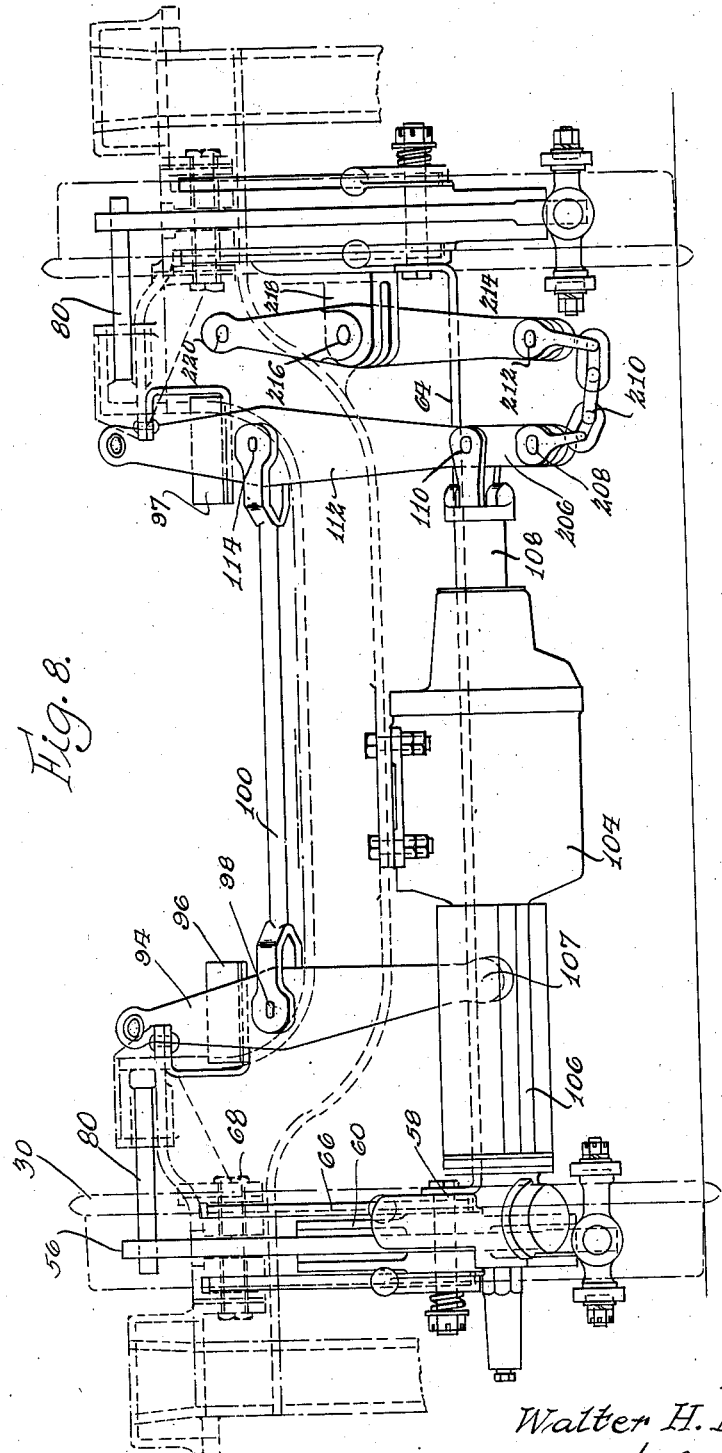

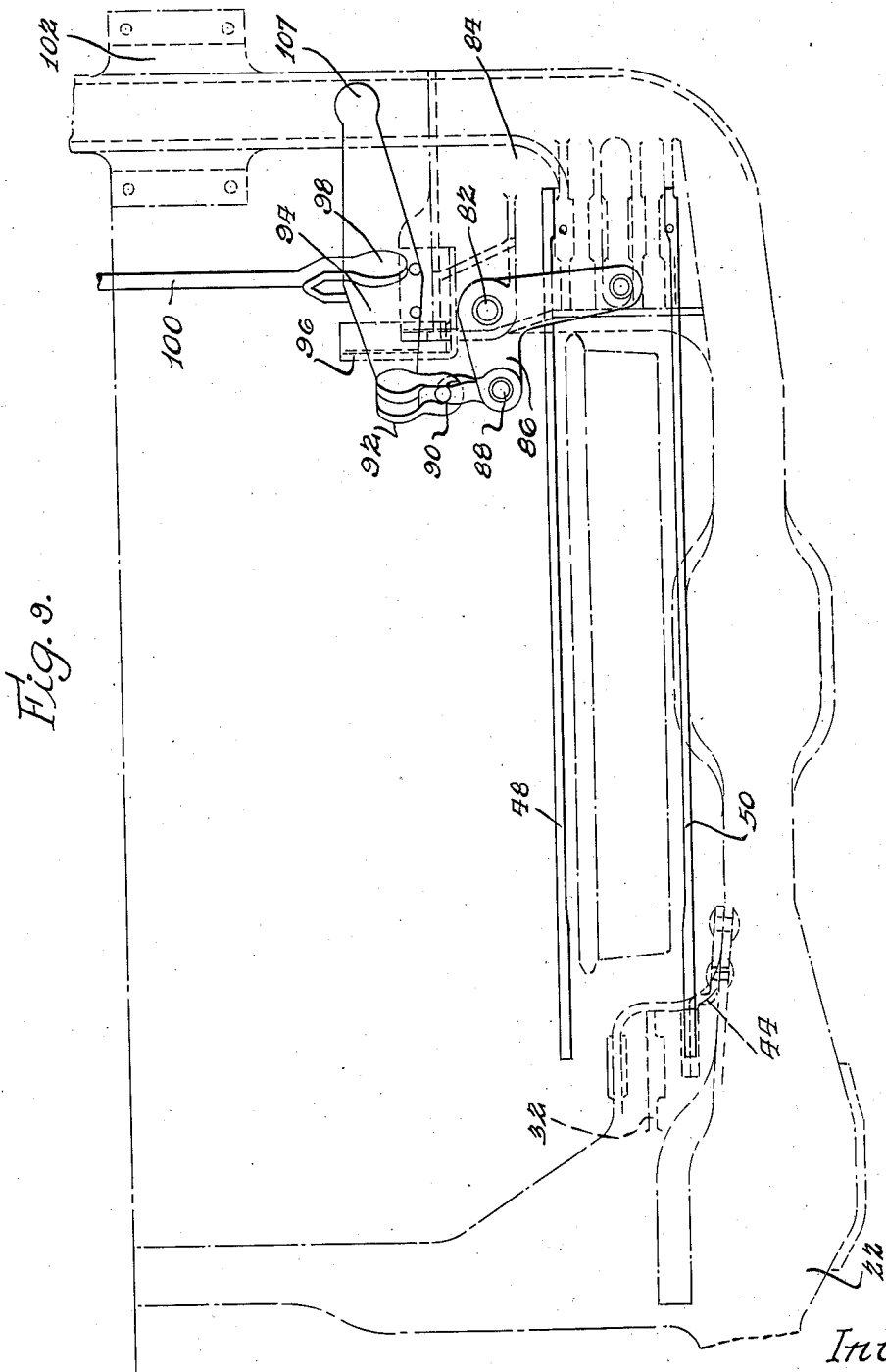

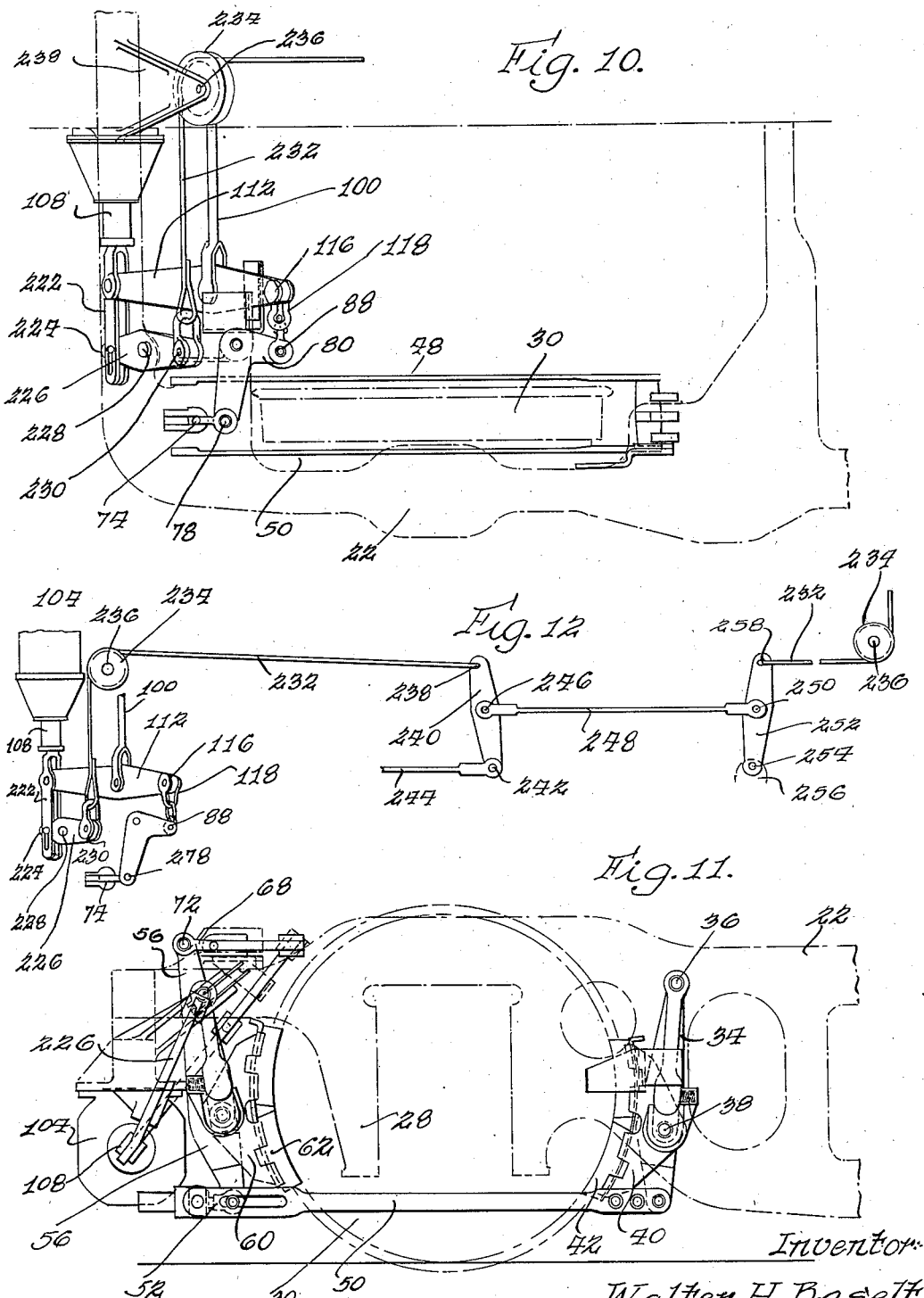

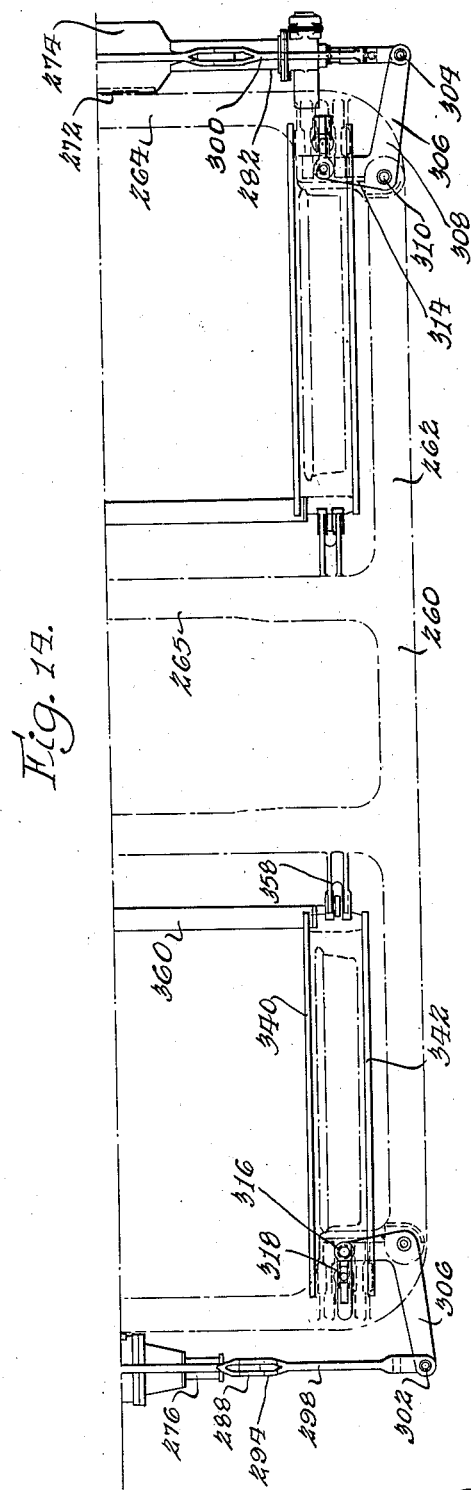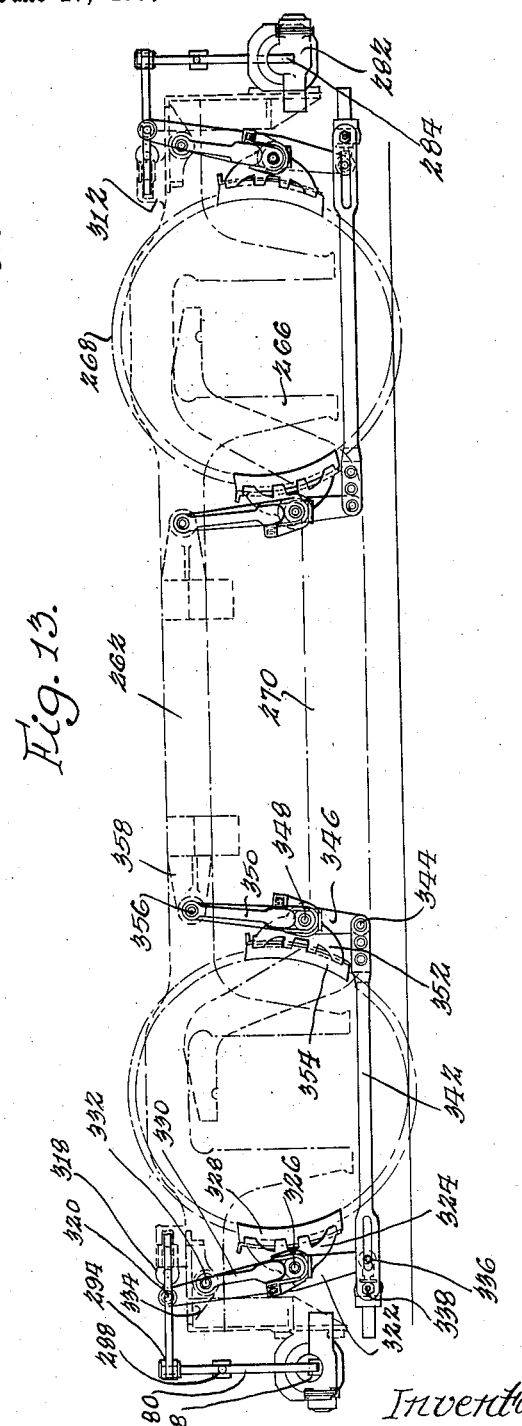

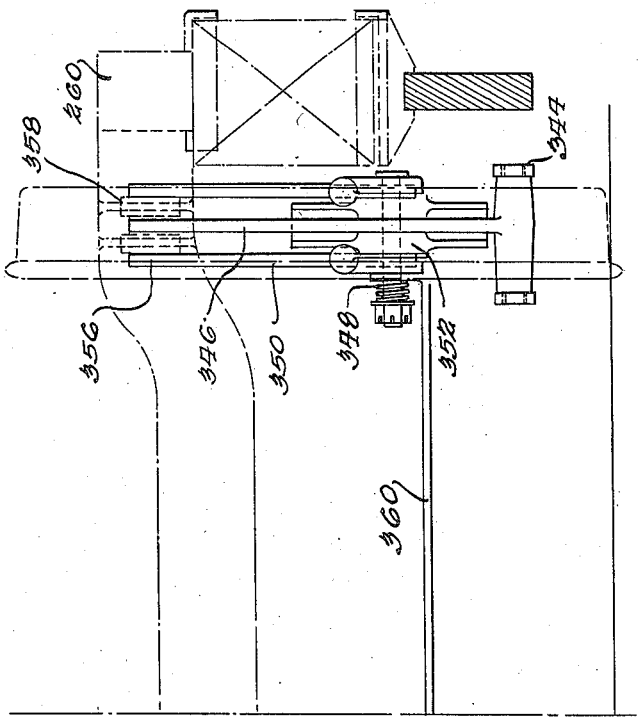
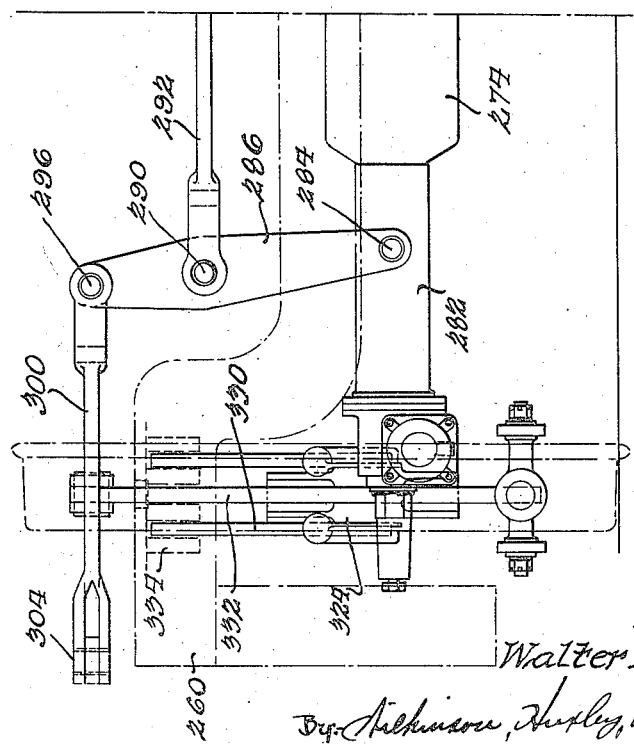

Patented Nov. 1, 1938

2,135,121

UNITED STATES PATENT OFFICE 2,135,121

BRAKE ARRANGEMENT

Walter H. Baselt, Chicago, Ill., assignor to American Steel Foundries, Chicago, Ill., a corporation of New Jersey Application June 17, 1935, Serial No. 27,067

25 Claims. (Cl. 188—56)

This invention pertains to brake mechanism.

It is desirable in some constructions of trains or cars to provide brake equipment which, while effective and powerful enough to handle the loads imposed upon it, still is disposed so as not to restrict the space between the end rails and side frames of the truck. This is particularly true in the present high speed type of trains wherein the motors are mounted on certain of the trucks, and other trucks are used to articulate adjacent cars.

It is therefore an object of this invention to provide a brake mechanism which will be effective for braking operation of high speed trains, yet is disposed to provide ample clearance for the mounting of the car bodies and the driving mechanism.

Another object is to provide a brake mechanism which is simple in form, inexpensive to make and maintain, and may be provided for each wheel and axle assembly.

Yet another object is to provide a brake mechanism which is flexible and may be provided with operating means disposed transversely of the truck.

A further object is to provide brake mechanism wherein automatic slack adjusting means is provided, which mechanism may be disposed transversely of the truck.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of one form of truck construction having applied thereto a form of brake mechanism embodying the invention;

Figure 2 is a fragmentary top plan view of the truck and brake construction illustrated in Figure 1;

Figure 5 is a side elevation of a truck and brake construction showing a modified form of hand brake mechanism as applied to the cylinder operated brake mechanism shown in Figure 1;

Figure 6 is a fragmentary top plan view of the truck and brake construction shown in Figure 5;

Figure 7 is an enlarged fragmentary side elevation of a form of truck and brake construction illustrated in Figure 1 having applied thereto additional hand operating means for the brake mechanism;

Figure 8 is an enlarged end elevation of the truck construction and brake mechanism illustrated in Figure 7;

Figure 9 is an enlarged fragmentary top plan view of the truck and brake mechanism illustrated in Figures 7 and 8, the same omitting the cylinder operating means and its associated slack adjuster;

Figure 10 is a fragmentary top plan view of a modified form of a truck construction and brake mechanism shown in Figures 7, 8 and 9, showing one form of hand brake connection therefor;

Figure 11 is a fragmentary side elevation of the truck construction and brake mechanism shown in Figure 10;

Figure 12 is a diagonal top plan of a modified form of hand brake mechanism for the truck construction and brake mechanism shown in Figures 10 and 11;

Figure 13 is a side elevation of another form of truck construction having applied thereto a modified form of brake mechanism embodying the invention;

Figure 14 is a fragmentary top plan view of the truck and brake construction illustrated in Figure 13;

Figure 15 is an enlarged fragmentary end elevation of the truck construction illustrated in Figures 13 and 14; and Figure 16 is an enlarged fragmentary transverse sectional elevation taken substantially in the plane of the transverse center line of the truck shown in Figures 13 and 14.

Figure 4:
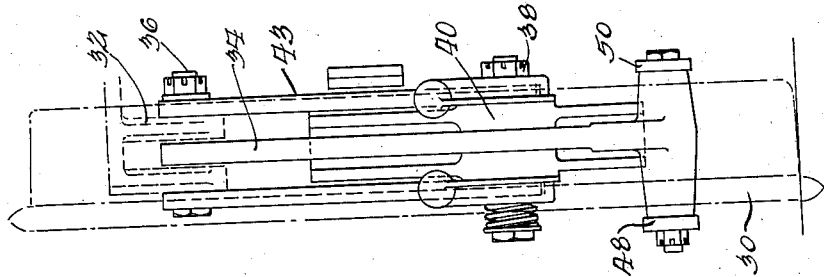
Figure 4 is an enlarged fragmentary transverse sectional elevation taken substantially in the plane of the transverse center line of the truck.
Figure 3:
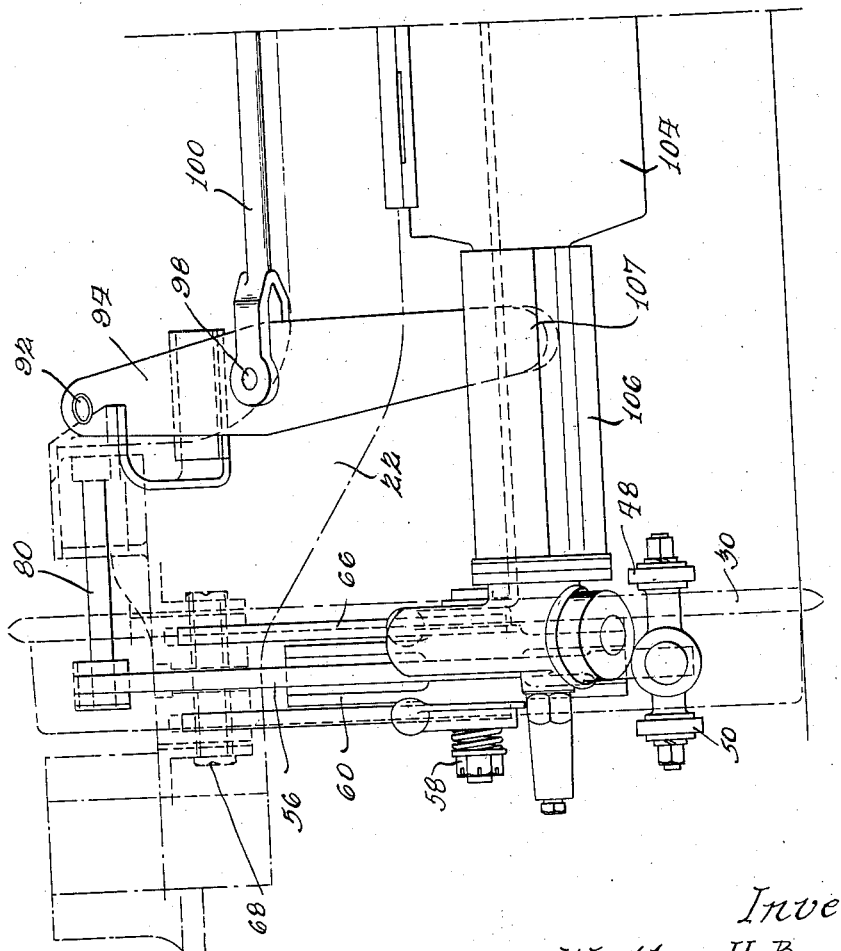
Figure 3 is an enlarged fragmentary end elevation of the truck construction illustrated in Figures 1 and 2.

Referring first of all more particularly to the constructions illustrated in Figures 1 to 12 inclusive, they may be used for either a motor or trailer truck. The truck frame 20 includes spaced side frames 22 integrally connected adjacent the ends thereof by means of the end rails 24 and integrally connected inwardly of said end rails by means of the transverse spaced transoms 26 adapted to accommodate a bolster (not shown). The side frames, in the modifications shown, are provided with the spaced pedestals 28 adapted to receive journal means (not shown) such as journal boxes adapted to have cooperative relation with the journal ends of the wheel and axle assemblies 30.

As each of the wheel and axle assemblies disposed at opposite ends of the truck is provided with individual mechanism, it will be sufficient to describe the brake mechanism for only a single wheel and axle assembly, corresponding numerals indicating corresponding parts of the similar mechanism of the other wheel and axle assembly, it being noted, however, that the horizontally disposed transversely extending operating cylinders at opposite ends of the truck operate in opposite directions.

The transom 26, or the junction of the transom with the side frame 22 is provided with the bracket 32 to which the dead truck lever 34 is pivotally connected as at 36. The dead truck lever is disposed in the plane of the wheel and is pivotally connected intermediate the ends thereof as at 38 to the brake head 40 provided with the brake shoe 42 adapted to have braking cooperation with the periphery of the wheel adjacent the inner side thereof, that is, inboard of the axle. Hanger links 43 may be provided pivoted to said brake head at 38 and the bracket 32 at 36. A positioning bracket 44 may be provided on the truck frame adjacent the dead truck levers to help maintain said levers in vertical position.

The dead truck lever 34 is adjustably connected as at 46 to the spaced inner and outer straps 48 and 50 embracing the wheel, being disposed below the axle thereof and being pivotally connected as through the manually operated slack adjuster 52 as at 54 to the lower end of the live truck lever 56, said live lever being likewise disposed in the plane of the wheel. The live lever 56 is pivotally connected intermediate the ends thereof as at 58 to the brake head 60 provided with the brake shoe 62 adapted to have braking cooperation with the periphery of the wheel on the outer side thereof. In the construction shown in Figures 7, 8 and 9, opposite live levers may be connected by the transverse strap 64 pivoted thereto as at 58, it being understood that the other constructions herein may also be provided with such a strap at both dead and live truck levers.

The hanger link 66 is pivotally connected at 58 to the truck lever 56 and is pivotally connected as at 68 to the truck frame bracket 70 for pivotally supporting the live truck lever and its associated mechanism. The upper end of the live truck lever is pivotally connected as at 72 to the clevis 74, said clevis being pivotally connected as at 76 to the outer arm 78 of the bell crank of dead frame lever 80. Said bell crank is pivotally connected as at 82 to the bracket 84 provided on the truck frame inwardly of the wheels and disposed between the side frame and end rail. The inner arm 86 of the bell crank at one side of the truck is pivotally connected as at 88 to the clevis 90, said clevis being pivotally connected as at 92 to the upper end of the diagonally disposed dead cylinder lever 94.

The dead cylinder lever 94 is adapted to have sliding support on the bracket 96 secured to the bracket 84, the dead cylinder lever intermediate the ends thereof being pivotally connected as at 98 to the pull rod 100. The end rail 24 is provided with a cylinder bracket 102, and the operating cylinder 104 is secured thereto substantially on the longitudinal center line of the truck and below the bracket 102. The operating cylinder 104 is provided with the automatic slack adjuster 106, though it is to be understood that an adjustable bracket or a manual slack adjuster may be provided on the cylinder or the end rail, or the automatic slack adjuster may be provided on said end rail.

The lower end of the dead cylinder lever 94 is pivotally connected to said automatic slack adjuster 106 as at 107. The piston 108 of said operating cylinder is pivotally connected as at 110 to the lower end of the live cylinder lever 112, said live cylinder lever extending upwardly and inwardly, being slidably supported on its bracket 97, the cylinder lever being pivotally connected intermediate the ends thereof as at 114 to the opposite end of the pull rod 100. The upper end of the live cylinder lever is pivotally connected as at 116 to the clevis 118 similar to the clevis 90, the outer end of said clevis being pivotally connected as at 88 to the inner arm of its bell crank 80.

In some railway cars it is desirable to provide hand brake operating means as well as the cylinder operating mechanism. In the construction illustrated in Figures 1 to 4 inclusive, the live cylinder lever 112 is pivotally connected as at 116 to the flexible connection 120, said connection passing around the guiding sheave 122 pivotally connected as at 124 to the car body (or truck frame) whence it extends inwardly, passing around the sheave 126 to the sheave 128, similar to the sheave 122, pivotally connected as at 130 to the car body (or truck frame), and from this sheave it is directed toward and pivotally connected to the upper end of the dead cylinder lever 94 as at 92. Thus a flexible connection is provided between the dead and live levers 94 and 112 at opposite ends of the truck.

The sheave 126 at one end of the truck, shown at the left end of the truck in Figure 2, is pivotally connected as at 132 to the pull rod 134 disposed substantially on the longitudinal center line of the truck, the opposite end of said pull rod being pivotally connected as at 136 to one end of the live operating lever 138. The pull rod 140 is pivotally connected adjacent one end thereof as at 142 to the live lever 138 intermediate the ends thereof, said pull rod 140 extending across the transoms and being pivotally connected at its opposite end as at 144 to the dead operating lever 146. The outer end of said lever is pivotally connected as at 148 to the bracket 150 provided on the car body. The inner or opposite end of the dead lever 146 is pivotally connected as at 152 to the pull rod 154, likewise disposed on the longitudinal center line of the truck, the opposite end of said pull rod 154 being pivotally connected as at 156 to its sheave 126. The outer end of the live operating lever 138 is pivotally connected as at 158 to a connection 160 extending toward and connected to hand brake operating means, such as the usual hand operated brake staff.

In the construction illustrated in Figures 5 and 6, the upper end of the live cylinder lever 56 is extended upwardly substantially above the top of the truck frame, and is pivotally connected as at 162 to the pull rod 164, the pull rod extending substantially in the plane of the wheel but above said wheel and being loosely connected as at 166 to the outer end of the transversely disposed equalizer bar 168. The equalizer bar 168 is connected as at 170 adjacent the longitudinal center line of the truck to the fulcrum 172, the opposite end of said fulcrum being pivotally connected as at 174 to the dead operating lever 176, the other end of said operating lever 176 being pivotally connected as at 178 to the bracket 180 provided on the car body.

The dead operating lever 176 is pivotally connected as at 182 intermediate the ends thereof to the pull rod 184, said pull rod extending across the transoms and being pivotally connected adjacent the opposite end thereof to the live operating lever 188 intermediate the ends of said lever. The live operating lever 188 adjacent the outer end thereof is pivotally connected as at 190 to the connection 192 extending toward and connected to hand operated means such as the usual brake staff connection. The inner end of said live operating lever 188 is pivotally connected as at 194 to the fulcrum 196 likewise disposed on the longitudinal center line of the truck frame, the other end of said fulcrum being connected as at 198 to the transversely disposed equalizer bar 200 which is loosely connected adjacent the ends thereof as at 202 to its pull rod 204 similar to the pull rod 164, the outer end of said pull rod 204 being pivotally connected as at 162 to the extension of the live truck lever at the opposite end of the truck.

In the construction illustrated in Figures 7, 8 and 9, the lower end of the live cylinder lever 112 is provided with an extension 206 which is pivotally connected as at 208 to the flexible connection shown as a chain 210, the opposite end of said flexible connection being pivotally connected as at 212 to the lower end of the dead equalizer lever 214. The equalizer lever 214 is pivotally connected as at 216 to the bracket 218 provided on the side frame, the upper end 220 of said equalizer lever being adapted to receive suitable connections with hand operating means which in turn may be operated on the associated car body. Such hand operating means may be of a nature as will be more particularly described with respect to Figures 10, 11 and 12.

In the construction shown in Figures 10 and 11, the piston rod 108 is provided with the extension 222 which is loosely connected through the pin and slot connection 224 to the lower end of the dead equalizer lever 226 which is similar to the equalizer 214. Thus the live cylinder lever 112 is supported partly by the lever 226, thereby relieving the piston. The equalizer lever 226 is also pivotally connected as at 228 to the truck frame extending upwardly and inwardly, the upper end of said dead equalizer lever being pivotally connected as at 230 to the flexible connection 232. Said flexible connection 232 extends inwardly toward the longitudinal center line of the truck frame where it passes over the guiding sheave 234 pivotally connected as at 236 to the bracket 238 provided on the end rail (or car body). Thence the flexible connection extends inwardly to a suitable hand brake operating means such as the usual brake staff. In this form of construction there is separate hand brake operating means for each end of each truck. Should it be desired to provide one hand brake operating means for each truck, this may be accomplished as illustrated in Figure 12.

In this case the flexible connection 232 passes around the guiding sheave 234 pivoted as at 236 and is connected as at 238 to the inner end of the live operating lever 240. The opposite end of said lever 240 is pivotally connected as at 242 to the flexible connection 244, which in turn extends to the hand brake operating means. The live operating lever 240 is pivotally connected as at 246 to one end of the pull rod 248, the other end of said pull rod being connected as at 250 to the dead lever 252 which is pivotally connected as at 254 adjacent the outer end thereof to the bracket 256 provided on the car body. The other or inner end of said dead operating lever 252 is pivotally connected as at 258 to the flexible connection 232 at the opposite end of the truck, which is similarly connected to the brake mechanism at that end of the truck as has already been described.

In operation of cylinder brake mechanism for these forms of brake mechanisms, assuming the brakes to be in released position, actuation of the cylinder 104 by the introduction of braking fluid thereto causes movement of the piston 108 toward its adjacent side frame whereby the lower end of the live cylinder lever 112 is moved outwardly, causing movement of the pull rod 100 in the direction of operation of the piston. Continued movement of the piston 108 causes the live cylinder lever 112 to pivot about its intermediate point 114 to move the inner arm of the bell crank 80 toward the opposite side frame, thus causing inboard movement of the outer arm of the bell crank whereby the upper end of the live truck lever is moved toward the adjacent axle, thus applying the outer brake shoe 62 to the periphery of the wheel.

Continued movement of the upper end of the live truck lever will cause the lower end of the live truck lever to pivot about the point 58 to cause the straps 48 and 50 to move the lower end of the dead truck lever 34 to apply the brake shoe 42 to the inner periphery of the wheel. Movement of the pull rod 100 by the piston 108 causes the dead cylinder lever 94 to pivot about the connection 107 with the slack adjuster 106 to cause the upper end of the dead lever 94 to move the inner arm 86 of its associated bell crank in a clockwise direction, whereby the outer end of the other arm of the bell crank is moved in an inboard direction to apply the truck levers in a manner already described for operation of the live cylinder lever. Release of the brake fluid causes inward movement of the piston 108 which causes release of the truck levers in a direction opposite to that already described.

In the event it is desired to operate the brake mechanism shown in Figures 1 to 4 inclusive, by the hand operating means particularly illustrated in Figures 1 and 2, outward movement of the connection 160 toward the left end of the truck as viewed in Figure 2 causes the pull rod 140 to be moved toward the left. Thus the dead operating lever 146 is moved in a counter-clockwise direction around its pivot 148 whereby the pull rod 154 is moved toward the left, causing the flexible connection 120 to move the upper ends of the live and dead cylinder levers toward each other whereby the bell cranks are moved to apply the brakes as in the case of the cylinder operation.

Continued movement of the connection 160 causes the live operating lever 138 to be rotated in a clockwise direction about its pivot 142, thus causing the pull rod 134 to move its flexible connection 120 to likewise operate the bell cranks 80 at the opposite end of the truck to set the brakes. Release of the hand operating means causes release of the brakes in an opposite direction to that described.

In operation of the hand brake mechanism of the construction illustrated in Figures 5 and 6, movement of the connection 192 toward the right as viewed in Figure 6 causes the pull rod 184 to move the dead operating lever 176 in a clockwise direction about its pivot 178, thus moving the equalizer bar 168 toward the right as viewed in Figure 6, whereby the pull rods 164 move the upper ends of the live truck levers inwardly to set the brake mechanism in a manner similar to that described in the operation of the cylinder operating means. Continued movement of the connection 192 causes the live operating lever 188 to be moved in a counter-clockwise direction about its pivot 186 to cause inward movement of the equalizer bar 200, thus causing the pull rods 204 to move the upper ends of the live truck levers at the opposite end of the truck from the first described truck levers to set the brakes at the opposite end of the truck in the same manner as described with respect to the adjacent cylinder operating means. Release of the hand brake operating means causes release of the brakes in an opposite direction to that already described.

In operation of the hand brake mechanism of the construction illustrated in Figures 10 and 11, movement of the flexible construction 232 causes inward movement of the upper end of the dead equalizer lever 226 (or 214), thus causing the lower end of the live cylinder lever 112 to be moved outwardly, either through the extension 222 or the links 210, thus causing braking operation of the brakes in a manner similar to that already described for the cylinder operation of the brake mechanism. In the case of Figures 10 and 11, operation of the brakes at opposite ends of the truck is effected through separate hand brake operating means.

In the construction illustrated in Figure 12, however, the same operation of the brakes is effected by movement of the connection 244 toward the left as viewed in said figure. This movement of the connection 244 causes the pull rod 248 to move the dead operating lever 252 in a counter-clockwise direction about its pivot 254, thus causing setting of the brakes at the right end of the truck as viewed in said figure through the flexible connection 232 disposed at said end of the truck. Continued movement of the connection 244 causes the live operating lever to be moved in a clockwise direction about its pivot 246, thus causing setting of the brakes at the left end of the truck as viewed in Figure 12 through its flexible connection 232. Release of the operating means shown in Figures 10, 11 and 12 causes release of the brake mechanism in a direction opposite to the setting operation.

Referring now more particularly to the construction illustrated in Figures 13 to 16 inclusive, the truck frame 260 consists essentially of the side frames 262 connected adjacent the ends thereof by means of the end rails 264 and connected intermediate the ends thereof by means of the spaced transoms 265 adapted to accommodate the bolster (not shown). The side frames are provided with the depending pedestals 266 adapted to accommodate the usual journal means, such as the journal boxes (not shown) of the wheel and axle assemblies 268. Equalizing means 270 may be provided between the journal means at opposite ends of the truck. As the brake connections at opposite ends of the truck are similarly constructed, it will be sufficient to describe the brake operating mechanism for only one end of said truck, it being understood of course that the operating means at opposite ends of the truck face in opposite directions.

The end rail 264 is provided with the vertically disposed cylinder bracket 272 to which the cylinder 274 is secured. The operating cylinder 274 is provided with the piston rod 276 pivotally connected as at 278 to the lower end of the substantially vertically disposed live cylinder lever 280. The cylinder is likewise provided with the automatic slack adjuster 282 extending in an opposite direction to the piston rod. The automatic slack adjuster 282 is pivotally connected as at 284 to the vertically disposed dead cylinder lever 286. It is of course understood that though an automatic slack adjuster is shown connected to the cylinder as at 284, such slack adjuster may be provided on the truck frame, or manual slack adjusting means or an adjustable bracket may be provided either on the operating cylinder or the truck frame for the pivotal connection 284 with the dead cylinder lever 286.

The live and dead cylinder levers 280 and 286 are pivotally connected as at 288 and 290 to the pull rod 292 intermediate the ends of said live and dead cylinder levers. The upper ends of the live and dead cylinder levers are pivotally connected as at 294 and 296 to the outwardly extending links 298 and 300. The outer ends of said links are pivotally connected as at 302 and 304 to the outer ends 306 of the bell cranks 308, said bell cranks being pivotally connected as at 310 to the bracket 312 provided on said side frames. The inner arms 314 of each of the bell cranks are pivotally connected as at 316 to the clevis 318 which is pivotally connected as at 320 to the upper end of the live truck lever 322. The live truck lever 322 is provided intermediate the ends thereof with the brake head 324 pivoted thereto as at 326, said brake head being provided with the brake shoe 328. The brake hangers 330 are disposed on each side of the live truck lever 322 pivotally connected as at 326 to said truck lever, the upper end of said hangers being pivotally connected as at 332 to the bracket 334 provided on said truck frame disposed in the plane of the adjacent wheels whereby the live truck levers are likewise disposed in the plane of the adjacent wheel.

The lower end of the live truck lever 322 is pivotally connected as at 336 to the manual slack adjuster 338 provided at the outer end of the spaced inner and outer straps 340 and 342. The straps 340 and 342 extend below the axle and are adjustably connected as at 344 to the lower ends of the dead truck lever 346 likewise disposed in the plane of the adjacent wheel. The dead truck lever 346 is pivotally connected as at 348 to the spaced hangers 350 and the inner brake head 352, said inner brake head being provided with the brake shoe 354. The upper ends of the dead brake lever and the hanger levers therefor are pivotally connected as at 356 to the brackets 358 provided on the transoms 265. In this form of construction the dead truck levers on opposite sides of the truck may be connected by means of the straps 360 pivotally connected to said dead truck levers as at 348.

Assuming the brakes to be in inoperative position, that is, released position, introduction of the brake fluid to the cylinders causes outward movement of the piston rods 276, causing the live cylinder lever to move the pull rod 292 to cause inward movement of the upper end of the dead cylinder lever 286, thus causing inward movement of the outer arm 306 of the bell crank 308. Inward movement of the arm 306 causes the upper end of the live brake lever to be moved inwardly, applying the brake shoe 328 to the outer periphery of the associated wheel. Continued movement of the upper end of the live truck lever will cause the lower end of said live truck lever to be moved outwardly, whereupon the straps 340 and 342 will cause movement of the lower end of the dead truck lever 346 to apply the brake shoe 354 to the inner periphery of the associated wheel. Movement of the lower end of the live cylinder lever by the piston causes the upper end of the live cylinder lever to be moved inwardly, thus causing the link 298 to move the outer end of its bell crank inwardly to cause braking operation of the brake levers at the opposite sides of the truck. Release of the braking fluid to cause the piston to be retracted releases the brakes in an opposite direction to that of applied position.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a brake arrangement, the combination of a truck frame including spaced side frames connected adjacent the ends thereof by end rail members, and connected intermediate said end rail members by spaced transom members, wheel and axle assemblies disposed in supporting relation to said truck frame and between an end rail member and the adjacent transom member, a dead truck lever pivoted to said truck frame on the inside of a wheel, a live truck lever supported on the outside of said wheel, a connection between said truck levers extending below the axle, and operating means for said levers extending transversely of said truck and operating in a transverse direction to control said brakes.

2. In a brake arrangement, the combination of a truck frame including a side frame, end rail members and spaced transom members, wheels supporting said truck frame, brake rigging having cooperative relation to one of said wheels, said rigging including a dead truck lever pivoted to said truck frame on the inside of said wheel and a live truck lever supported on the outside of said wheel, a connection between said levers of said wheel, a connection between said levers and below the wheel center, a bell crank pivoted to said truck frame and connected to one of said brake levers, and a transversely disposed brake cylinder operatively connected to said bell crank.

3. In a brake arrangement, the combination of a truck frame including a side frame, end rail members and spaced transom members, wheels supporting said truck frame, brake rigging having cooperative relation to one of said wheels, said rigging including a dead truck lever pivoted to said truck frame on the inside of said wheel and a live truck lever supported on the outside of said wheel, a connection between said levers and below the wheel center, a bell crank levers and below the wheel center, a bell crank pivoted to said truck frame and connected to one of said brake levers, and a transversely disposed brake cylinder supported on one of said end rail members and operatively connected to said bell crank.

4. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed below the adjacent axle, a bell crank disposed adjacent each live truck lever and pivoted to said truck frame, said bell crank being pivotally connected to the adjacent live truck lever, a transversely disposed operating cylinder supported on each end rail and having an automatic slack adjuster thereon, an upwardly and inwardly extending dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, a connection between said live and dead cylinder levers intermediate the ends thereof, a car body supported on said truck frame, hand brake operating mechanism supported on said car body, said hand brake operating mechanism including a flexible connection between live and dead cylinder levers at opposite ends of the truck, a dead lever pivoted at one end to said car body, a pull rod connected to the other end of said last named dead lever and to one of said flexible connections intermediate the ends thereof, a live lever, a connection between said last named live and dead levers intermediate the ends thereof, one end of said last named live lever being connected to operating means and the other end of said last named live lever being connected to the other flexible connection intermediate its ends.

5. In a brake arrangement, the combination of a truck frame, a wheel disposed in supporting relation thereto, brake means for said wheel, operating means for said brake means including a transversely disposed operating cylinder, and hand brake operating means associated with said brake means adjacent said cylinder, operative movement of the hand brake means at its connection to said brake means being in a direction opposite to that of the piston of said cylinder.

6. In a brake arrangement, the combination of a truck frame, a wheel disposed in supporting relation thereto, brake means for said wheel, operating means for said brake means including a transversely disposed operating cylinder supported on said truck frame, and hand operating means associated with said brake means adjacent said cylinder and having a portion thereof disposed on said truck frame, operative movement of the hand brake means at its connection to said brake means being in a direction opposite to that of the piston of said cylinder.

7. In a brake arrangement, the combination of a truck frame, a wheel disposed in supporting relation thereto, brake means for said wheel, operating means for said brake means including a transversely disposed operating cylinder, a cylinder lever operated thereby, said cylinder lever being operatively connected to said brake means, and hand operating means including a lever pivoted to said truck frame and operatively connected to said cylinder lever.

8. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member, live and dead cylinder levers connected to each other, one of said levers being connected to the piston of the operating cylinder, the other of said levers being operatively connected to said brake rigging, a dead lever connected to said live cylinder lever, operating means connected to said last named dead lever, said operating means including a sheave pivotally mounted on said truck frame, and a flexible connection connected to said last named dead lever and engaging said sheave and being adapted to be connected to hand brake operating means.

9. In a brake arrangement, the combination of a car body, a truck supporting said car body, said truck having spaced wheel and axle assemblies, brake mechanism for each wheel and axle assembly, hand brake mechanism on said car body for said brake mechanism, said hand brake mechanism including a flexible connection between brake mechanism at opposite sides and at opposite ends of the truck, a dead lever pivoted at one end to said car body, a pull rod connected to the other end of said last named dead lever and to one of said flexible connections intermediate the ends thereof, a live lever, a connection between said last named live and dead levers intermediate the ends thereof, one end of said last named live lever being connected to operating means and the other end of said last named live lever being connected to the other flexible connection intermediate its ends.

10. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed below the adjacent axle, a bell crank disposed adjacent each live truck lever and pivoted to said truck frame, said bell crank being pivotally connected to the adjacent live truck lever, a transversely disposed operating cylinder supported on each end rail having an automatic slack adjuster thereon, a vertically disposed dead cylinder lever pivotally connected to said automatic slack adjuster and to the adjacent bell crank, a vertically disposed live cylinder lever pivotally connected to the piston of said cylinder on the side opposite said slack adjuster and pivotally connected to its adjacent live truck lever, and a connection between said live and dead cylinder levers intermediate the ends thereof.

11. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed below the adjacent axle, certain of said truck levers being connected on opposite sides of the truck by a transverse strap, a bell crank disposed adjacent each live truck lever and pivoted to said truck frame, said bell crank being pivotally connected to the adjacent live truck lever, a horizontally disposed operating cylinder connected to each of said end rails and having a piston operating in the direction of one of said side frames, a support on said cylinder extending in a direction toward the opposite side frame, an upwardly and inwardly extending dead cylinder lever pivoted to said support and to the adjacent bell crank, an upwardly and inwardly extending live cylinder lever pivotally connected to said piston and to its adjacent bell crank, and a connection between said cylinder levers intermediate the ends thereof.

12. In a brake arrangement, the combination of a car body, a truck supporting said car body, said truck having spaced wheel and axle assemblies, brake mechanism for each wheel and axle assembly, hand brake mechanism on said car body for said brake mechanism, said hand brake mechanism including a pull rod connected to the brake mechanism for each wheel, an equalizer bar extending transversely of the truck and connecting pairs of said last named pull rods inwardly of the wheels, a dead lever pivotally connected adjacent one end to said car body and pivotally connected adjacent the other end to one of the equalizer bars adjacent the center thereof, a live lever connected at one end to operating means and connected adjacent the other end to the other equalizer bar adjacent the center thereof, and a pull rod connecting said last named dead and live levers intermediate the ends thereof.

13. In a brake arrangement, the combination of a car body, a truck frame for supporting said car body, said truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, a horizontally disposed brake cylinder connected to each of said end rails and having a piston operating in the direction of one of said side frames, a support on said cylinder extending in a direction toward the opposite side frame, a dead cylinder lever pivoted to said support and to the adjacent brake mechanism on one side of the truck, a live cylinder lever pivotally connected to said piston and to the brake mechanism on the other side of the truck, a connection between said cylinder levers intermediate the ends thereof, a dead equalizer lever connected to the truck frame adjacent each of said live cylinder levers, a connection between said last named dead lever and each of said live cylinder levers, a sheave pivotally connected to said truck frame adjacent the longitudinal center line thereof and at each end of said frame, a dead lever pivoted to said car body adjacent one of said transoms, a flexible connection extending from said last named dead lever around said sheave and connected to one of said equalizer levers, a live lever connected to the dead lever on said car body and adapted to be connected to hand brake operating means, and a flexible connection to said last named live lever and extending around the other sheave and connected to the other equalizer lever.

14. In a brake arrangement, the combination of a truck frame, brake mechanism thereon, power operating means including a cylinder, a piston in said cylinder, a cylinder lever connected to said piston and brake mechanism whereby operation of said piston operates said brake mechanism, and auxiliary brake operating means including a lever loosely connected to said piston and pivoted to be rotated transversely of said truck frame.

15. In a brake arrangement, the combination of a car body, a truck supporting said car body, said truck having spaced wheel and axle assemblies, brake mechanism for each wheel and axle assembly, hand brake mechanism on said car body for said brake mechanism, said hand brake mechanism including a flexible connection between the brake mechanism at one side of said truck and one end of said truck to a dead operating lever, a flexible connection from the opposite side of said truck at the opposite end of said truck to a live operating lever spaced from said dead operating lever, a connection between said dead and live operating levers, and a hand brake connection to said live operating lever.

16. In a brake arrangement, the combination of a truck frame including a side frame, end rail members and spaced transom members, wheels supporting said truck frame, brake rigging having cooperative relation to one of said wheels, said rigging including a dead truck lever pivoted to said truck frame on the inside of said wheel and a live truck lever supported on the outside of said wheel, a connection between said levers and below the wheel center, a bell crank pivoted to said truck frame and connected to one of said brake levers, and a transversely disposed brake cylinder supported on one of said first named members and operatively connected to said bell crank.

17. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member and operatively connected to said brake rigging, the operative connection including a cylinder lever connected to the piston of said cylinder, and hand operating means including a lever pivoted to said truck frame and operatively connected to said cylinder lever.

18. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member, live and dead cylinder levers connected to each other, one of said levers being connected to the piston of the operating cylinder, the other of said levers being operatively connected to said brake rigging, a dead lever connected to said live cylinder lever, and operating means connected to said last named dead lever.

19. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member, live and dead cylinder levers connected to each other, one of said levers being connected to the piston of the operating cylinder, each of said levers being operatively connected to said brake rigging, a dead lever connected to said live cylinder lever, and operating means connected to said last named dead lever.

20. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, a horizontally disposed brake cylinder connected to each of said end rails and having a piston operating in the direction of one of said side frames, a support on said cylinder extending in a direction toward the opposite side frame, a dead cylinder lever pivoted to said support and to the adjacent brake mechanism on one side of the truck, a live cylinder lever pivotally connected to said piston and to the brake mechanism on the other side of the truck, a connection between said cylinder levers intermediate the ends thereof, a dead lever connected to said live cylinder lever, and operating means connected to said last named dead lever.

21. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member, live and dead cylinder levers connected to each other, one of said levers being connected to the piston of the operating cylinder, the other of said levers being operatively connected to said brake rigging, a dead lever connected to said live cylinder lever, and operating means connected to said last named dead lever.

22. In a brake arrangement, the combination of a truck frame, said truck frame including spaced side frames, a transverse connecting member, a wheel and axle assembly supporting said truck frame, brake rigging disposed to have braking cooperation with the wheels, a transversely disposed operating cylinder supported on said transverse member, live and dead cylinder levers connected to each other, one of said levers being connected to the piston of the operating cylinder, each of said levers being operatively connected to said brake rigging, a dead lever connected to said live cylinder lever, and operating means connected to said last named dead lever.

23. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, a horizontally disposed brake cylinder connected to each of said end rails and having a piston operating in the direction of one of said side frames, a support on said cylinder extending in a direction toward the opposite side frame, a dead cylinder lever pivoted to said support and to the adjacent brake mechanism on one side of the truck, a live cylinder lever pivotally connected to said piston and to the brake mechanism on the other side of the truck, a connection between said cylinder levers intermediate the ends thereof, a dead lever connected to said live cylinder lever, and operating means connected to said last named dead lever.

24. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed below the adjacent axle, a dead frame lever disposed adjacent each live truck lever and pivoted to said truck frame, said frame lever being pivotally connected to the adjacent live truck lever, a transversely disposed operating cylinder supported on each end rail and having an automatic slack adjuster thereon, a dead cylinder lever pivotally connected to said automatic slack adjuster and to the adjacent frame lever, a live cylinder lever pivotally connected to the piston of said cylinder on the side opposite said slack adjuster and pivotally connected to its adjacent live truck lever, and a connection between said live and dead cylinder levers intermediate the ends thereof.

25. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed below the adjacent axle, a dead frame lever disposed adjacent each live truck lever and pivoted to said truck frame, said frame lever being pivotally connected to the adjacent live truck lever, a horizontally disposed operating cylinder connected to each of said end rails and having a piston operating in the direction of one of said side frames, a support on said cylinder extending in a direction toward the opposite side frame, a dead cylinder lever pivoted to said support and to the adjacent frame lever, a live cylinder lever pivotally connected to said piston and to its adjacent frame lever, and a connection between said cylinder levers intermediate the ends thereof.

WALTER H. BASELT.